(12) United States Patent
Behun et al.

(10) Patent No.: US 7,204,202 B2
(45) Date of Patent: Apr. 17, 2007

(54) PET DISH AND DISPOSABLE LINER

(76) Inventors: William G. Behun, 4572 Norma Dr., San Diego, CA (US) 92115; Gail Dana, 4572 Norma Dr., San Diego, CA (US) 92115

(*) Notice: Subject to any disclaimer, the term of this patent is extended or adjusted under 35 U.S.C. 154(b) by 0 days.

(21) Appl. No.: 11/150,704

(22) Filed: Jun. 10, 2005

(65) Prior Publication Data

US 2006/0278168 A1 Dec. 14, 2006

(51) Int. Cl.
*A01K 5/01* (2006.01)
*B65D 21/02* (2006.01)

(52) U.S. Cl. ............ 119/61.5; 220/574.3; 220/495.01; 220/23.88; 220/23.89

(58) Field of Classification Search ............... 119/61.5, 119/61.53, 61.54, 61.55; D30/129, 130; 220/574.3, 4.26, 495.01, 495.03, 23.87, 23.88, 220/23.89
See application file for complete search history.

(56) References Cited

U.S. PATENT DOCUMENTS

| | | | | |
|---|---|---|---|---|
| 730,082 | A * | 6/1903 | Bates | 220/574.3 |
| 1,583,512 | A * | 5/1926 | Worth | 220/574.3 |
| 2,170,040 | A * | 8/1939 | Kimberly | 220/574 |
| 2,588,727 | A * | 3/1952 | Howard | 220/574 |
| 3,076,579 | A * | 2/1963 | Kuhlman | 220/574.3 |
| 3,080,997 | A * | 3/1963 | Brown | 220/606 |
| 3,152,576 | A * | 10/1964 | Faurot | 119/72 |
| 3,347,411 | A * | 10/1967 | Kalata et al. | 206/519 |
| 3,413,820 | A * | 12/1968 | Paquin | 62/371 |
| 3,527,192 | A * | 9/1970 | Ferrara | 119/61.5 |
| 3,653,362 | A * | 4/1972 | Davis | 119/61.5 |
| 3,672,538 | A * | 6/1972 | Wiedemann | 206/519 |
| 3,698,594 | A | 10/1972 | Boehlert | 220/63 |
| 3,720,184 | A | 3/1973 | Pearce | |
| 3,749,276 | A * | 7/1973 | Davis | 220/789 |
| 4,182,462 | A * | 1/1980 | Buff, Jr. | 220/495.03 |
| 4,270,490 | A * | 6/1981 | Kopp | 119/61.5 |
| 4,428,325 | A * | 1/1984 | Koch | 119/61.5 |
| 4,573,434 | A | 3/1986 | Gardner | |
| 4,800,845 | A * | 1/1989 | Budd | 119/61.5 |
| 4,803,954 | A * | 2/1989 | Welch et al. | 119/61.53 |
| 4,840,143 | A | 6/1989 | Simon | |
| D303,441 | S * | 9/1989 | Keller | D30/129 |
| D330,785 | S | 11/1992 | Jordan | D30/129 |
| D343,482 | S * | 1/1994 | Keller et al. | D30/130 |
| D358,008 | S * | 5/1995 | Keller et al. | D30/161 |
| 5,445,110 | A * | 8/1995 | Birnie | 119/61.5 |
| 5,485,937 | A * | 1/1996 | Tseng | 220/571 |
| D377,246 | S * | 1/1997 | Clenney | D30/162 |
| D383,254 | S * | 9/1997 | Feldman et al. | D30/129 |
| 5,687,783 | A | 11/1997 | Finnegan | |
| 5,709,168 | A * | 1/1998 | Walker | 119/61.5 |

(Continued)

Primary Examiner—Yvonne R. Abbott
(74) Attorney, Agent, or Firm—Steins & Associates, P.C.

(57) ABSTRACT

A Pet Dish and Disposable Liner. The dish is durable and washable, but the liner is made from low-cost material such that it can be disposable, if desired. The dish and liner are both aesthetically pleasing, particularly since they resemble a pet's face. The dish and liners are cooperatively designed so that the liner inserted into the dish will not inadvertently be forced out by the eating pet, nor will the liner be allowed to spin within the dish. The dish and liner are also configured so that a stack of liners can be held conveniently within a single dish.

16 Claims, 6 Drawing Sheets

U.S. PATENT DOCUMENTS

| | | |
|---|---|---|
| 5,711,248 A | 1/1998 | Boyd |
| 5,782,374 A * | 7/1998 | Walker .................... 220/23.87 |
| D406,926 S | 3/1999 | Kolozsvari |
| 6,044,797 A * | 4/2000 | Leason et al. ................. 119/72 |
| 6,079,361 A | 6/2000 | Bowell et al. |
| 6,314,911 B1 * | 11/2001 | Kaytovich ................. 119/61.5 |
| 6,318,291 B1 * | 11/2001 | Wolanski ................... 119/61.5 |
| 6,378,460 B1 | 4/2002 | Skurdalsvold-Vanskiv |
| 6,477,981 B1 | 11/2002 | Harper |
| 6,644,241 B2 * | 11/2003 | Brown ....................... 119/61.5 |
| 6,840,191 B2 * | 1/2005 | Gaspary et al. ............ 119/61.5 |

* cited by examiner

PET DISH AND DISPOSABLE LINER

BACKGROUND OF THE INVENTION

1. Field of the Invention

This invention relates generally to pet products and, more specifically, to a Pet Dish and Disposable Liner.

2. Description of Related Art

Pet food and water dishes are available in virtually all shapes and sizes, and typically present a common problem for the pet caretakers—they become soiled and are very undesirable to clean once in that condition.

Several inventions have sought to solve this problem using a variety of techniques. Birnie, U.S. Pat. No. 5,445,110 discloses a "Pet Feeding System with Disposable Inserts." The Birnie device is a semi-spherical bowl having a stack of disposable bowl liners within it. The liners each have an adhesive tab to hold them in their place in the stack. Each liner further has a thumb notch to assist the caretaker in removing the soiled liner for disposal. Another device is the Jordan "Combined Pet Food Bowl and Disposable Liner," U.S. Pat. No. D330,785. The Jordan device is a cylindrical bowl having a similarly-shaped liner; the liner has a protruding tab that presumably aids in the removal of the liner from the bowl. Another device is the Budd "Disposable Pet Food Dish," U.S. Pat. No. 4,800,845. It is a bowl having a pair of rectangular bowls formed within it; each bowl has one or more dimples or "raised portions" in their walls to hold the liners in the bowls while in use to provide food and water to the pet. Koch, U.S. Pat. No. 4,428,325 is a "Feeding Bowl and Liner Therefor," is a bowl/liner combination with horizontal and vertical recesses to retain the liner within the bowl and to aid the caregiver in pulling the liners out of the bowl. Finally, the Boehlert "Disposable Feeding Dish and Its Complementary Receptacle," U.S. Pat. No. 3,698,594 is a cylindrical bowl having a liner, where the liner is adhered to the bowl with a temporary adhesive to prevent its pulling out while the pet is feeding.

None of the numerous aforementioned attempts at solving the soiled food dish problem has truly provided a desirable solution. Notably lacking is a bowl/liner combination that has any aesthetic attractiveness. Furthermore, the only prior devices that included the capacity to hold a stack of liners required adhesive between each liner; making these approaches undesirable from the perspective of manufacturing, storage and shipping. Furthermore, to prevent spinning (a common problem with the basic bowl-and-liner design), these prior devices either require adhesive, or if they do have some other approach, this other approach is limited to a non-stacked liner arrangement and/or it is very difficult to overcome the anti-spin element so that the liner can be removed.

What is needed, then, is a pet dish and liner combination that is aesthetically appealing, includes anti-spin features, yet still permits a stack of liners to be held within the bowl without the need for supplemental adhesive or some sort of tool to remove the liners from the bowl.

SUMMARY OF THE INVENTION

In light of the aforementioned problems assocaited with the prior devices, it is an object of the present invention to provide a Pet Dish and Disposable Liner. The dish should be durable and washable, but the liner should be made from low-cost material such that it is disposable, if desired. The dish and liner should both be aesthetically pleasing. The dish and liners should be cooperatively aligned so that the liner inserted into the dish will not inadvertently be forced out by the eating pet, nor should the liner be allowed to spin within the dish. The dish and liners should also be configured so that a stack of liners can be held conveniently within a single dish. The dish would be particularly attractive if it resembled the face of a pet, such as a cat or dog.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a Pet Dish and Disposable Liner.

Figure 1:
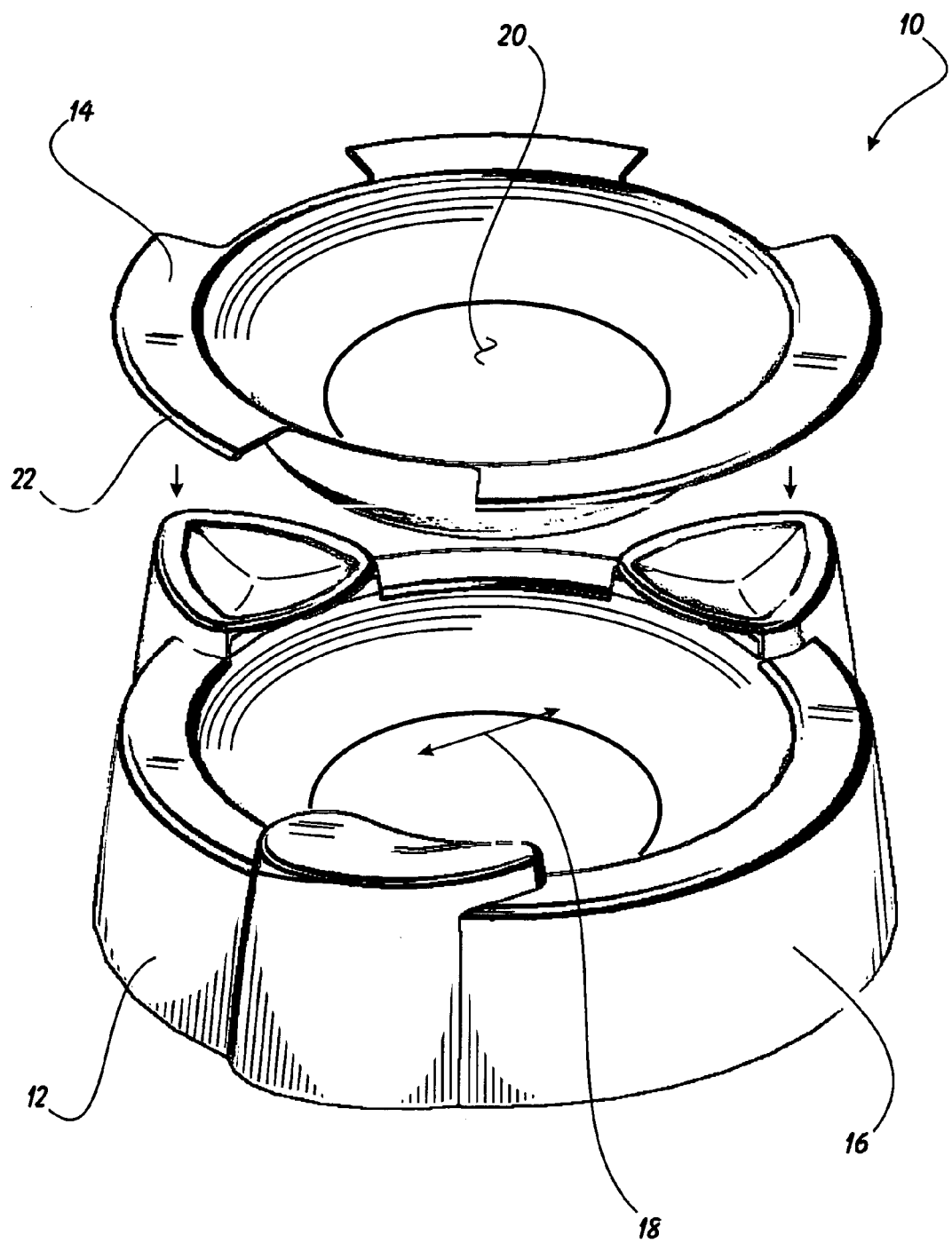
FIG. 1 is an exploded perspective view of a preferred embodiment of the pet dish with disposable liner of the present invention.

The present invention can best be understood by initial consideration of FIG. 1. FIG. 1 is an exploded perspective view of a preferred embodiment of the pet dish with disposable liner 10 of the present invention. The dish 121 has a generally circular or cylindrical shape, and defines a spherically bowl-shaped recessed portion in its center and has a side wall 16 generally defining its periphery.

The liner 14 is made to closely nest within the recessed portion 18 of the bowl 12, and is made from a thin-walled (typically polymeric) material to provide durability yet low cost. The liner 14 has a center receptacle 20 for food or water, and is bounded on its outer periphery by a side lip 22. The side lip 22 provides additional protection against slop-over of food onto the side wall 16 of the bowl, as well as preventing material from getting food material from getting in between layers of liners 14. If we now turn to FIG. 2, we can examine this novel dish in more detail.

Figure 2:
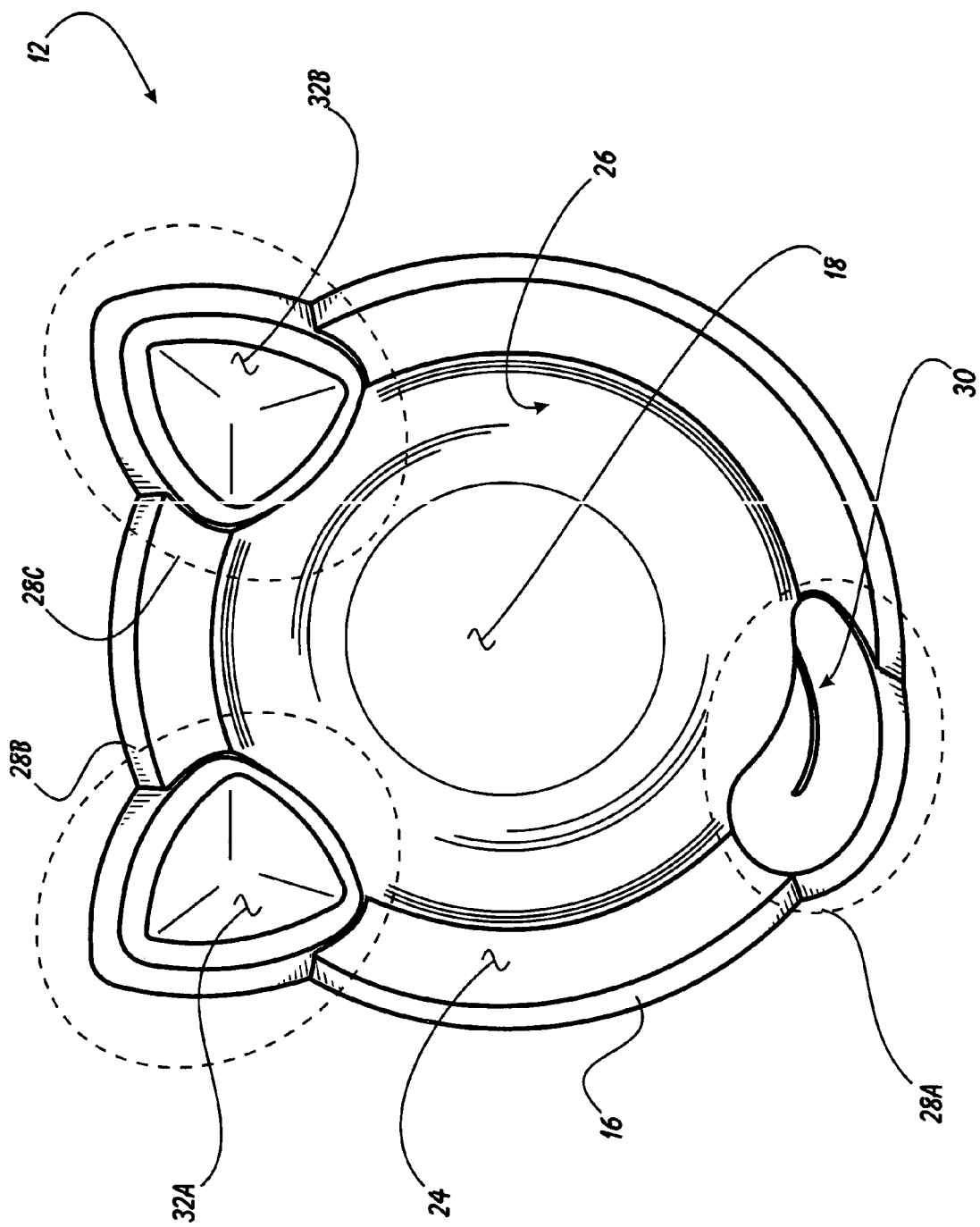
FIG. 2 is a top view of the pet dish of FIG. 1.

FIG. 2 is a top view of the pet dish 12 of FIG. 1. As should be apparent, this particular embodiment is formed to resemble a cat's face. The circular side wall 16 has a first liner retaining element 28A protruding from it that resembles the cat's tongue. Second and third liner retaining elements, 28B and 28C resemble the cat's ears. While not shown in the drawings, the liner (see FIG. 1) may further have eyes and a nose inscribed on it to further convey the resemblance to a cat.

The first liner retainer retaining element 28A has a groove 30 formed in its top surface so that it looks more like a tongue. Similarly, the second and third liner retaining elements 28B and 28C have recessed portions 32A and 32B, respectively, to increase their aesthetic representation of a cat's ear.

The central semispherical recessed portion 18 is formed by the interior wall 26 of the dish 12. The interior wall 26 and side wall 16 terminate at their top surfaces in the top wall 24. The top wall 24 is a generally flat surface encircling the recessed portion 18 that is broken in its continuity by the liner retaining elements 28A–28C that extend upwardly from the top wall 24 to create more distinctive animal-like features to the dish 12. As should further be noticed, the outer walls of each of the liner retaining elements 28A–28C extend outwardly from the side wall 16.

In other non-depicted versions, a dog or other species' face might be emulated, with the liner retaining elements 28A–28C being shaped to more closely resemble that animal's features. We will now turn to FIG. 3 to examine the dish features in more detail.

Figure 3:
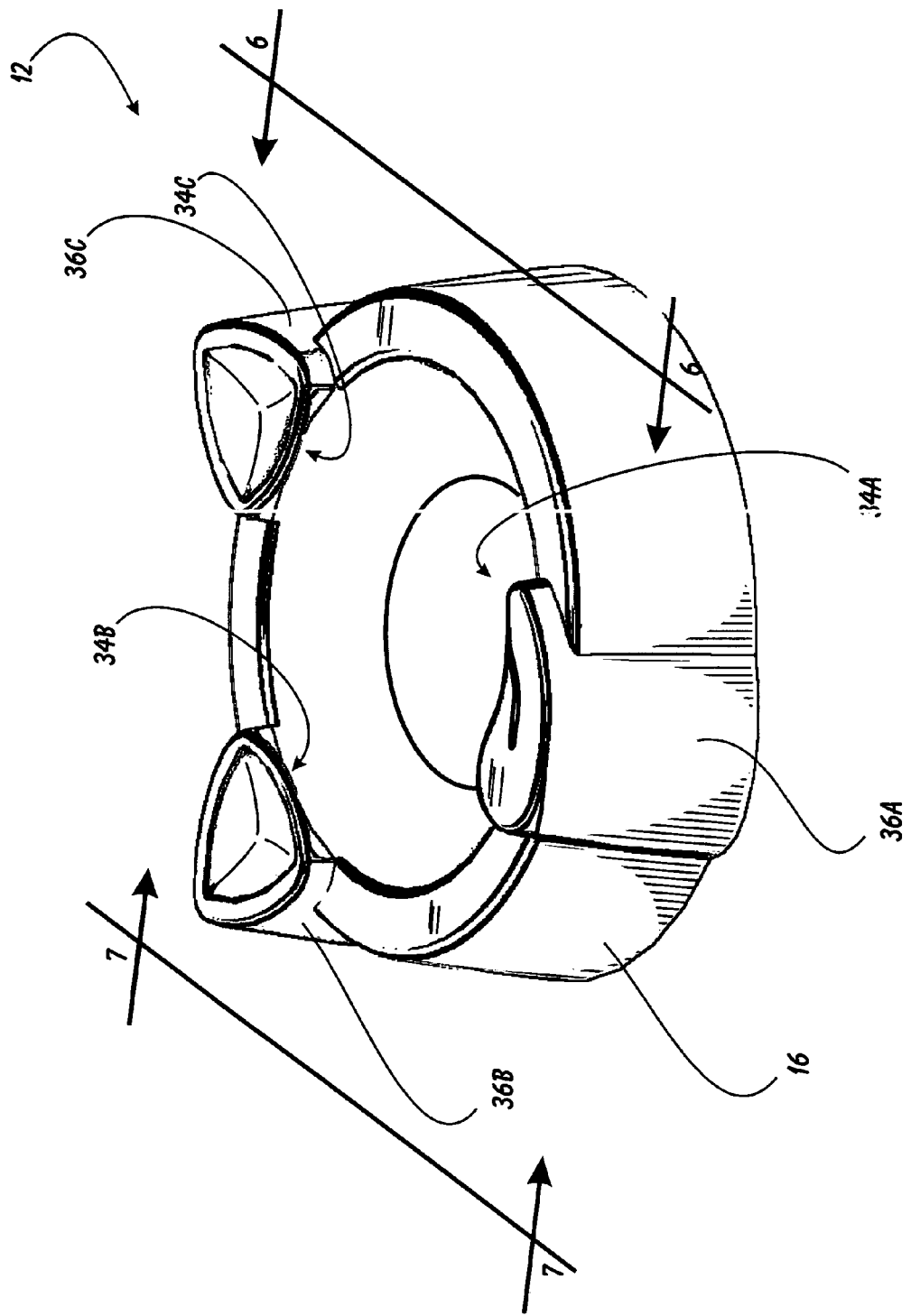
FIG. 3 is a perspective view of the pet dish of FIGS. 1 and 2.

FIG. 3 is a perspective view of the pet dish 12 of FIGS. 1 and 2. Here, as in FIG. 1, the liner retaining elements 28A–28C, seen in a perspective view, reveal that each element 28 has a retaining lip 34A–34C formed on its inwardly-facing side. The retaining lips 34A–34C serve to hold down the liner(s) that are inserted within the recessed portion of the dish 12. Furthermore, the retaining lips 34A–34C, in that they rise up above the surface of the top wall (see FIG. 2) of the dish 12, prevent the liners from spinning when the pet licks the liner to get all of its food out. Also depicted here more clearly is that the first, second and third liner retaining elements have respective side walls 36A, 36B and 36C that protrude outward from the dish side wall 16 (see FIG. 1). Review of the design of the liners is provided in connection with FIG. 4.

Figure 4:
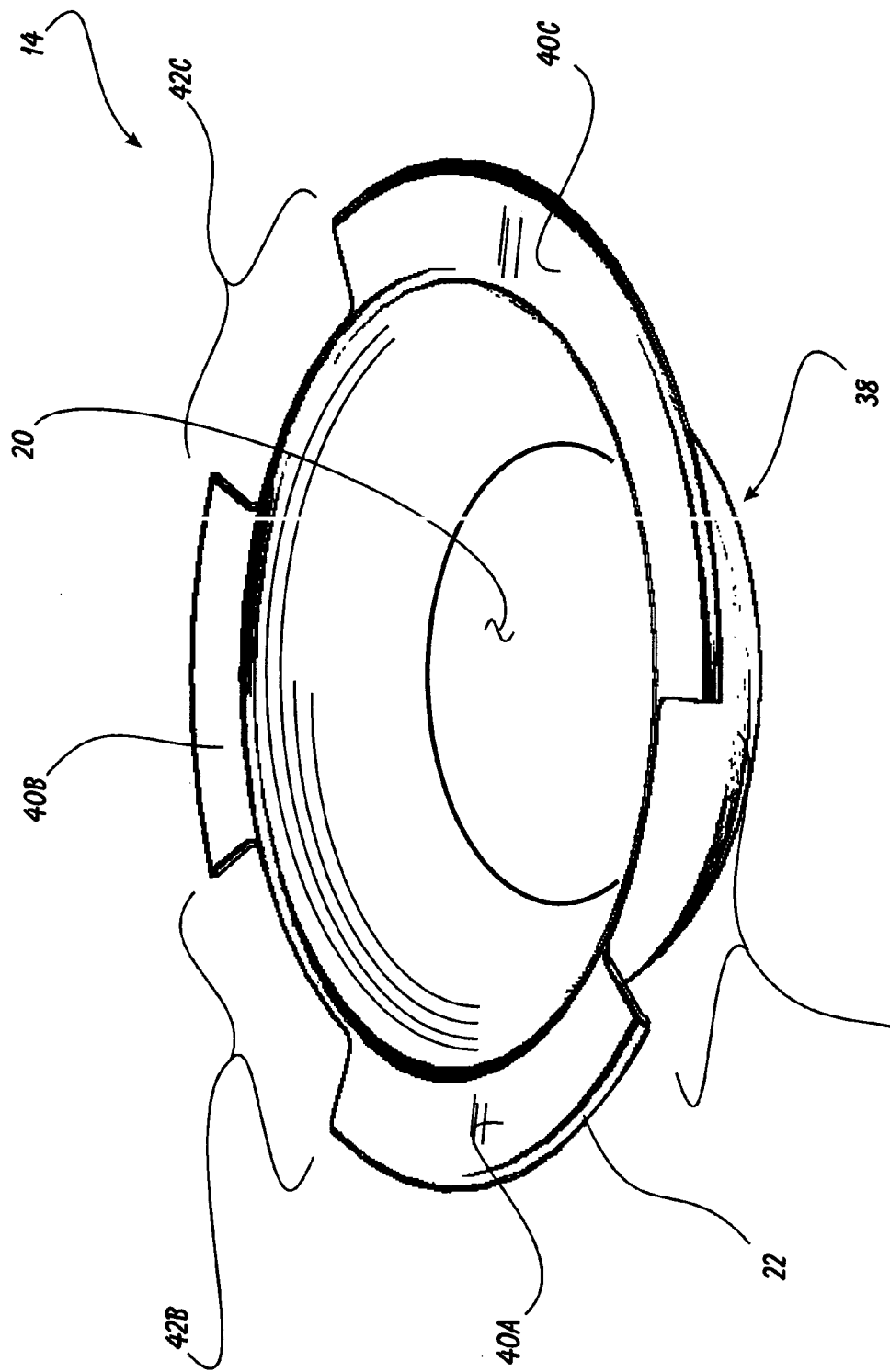
FIG. 4 is a perspective view of the disposable liner of FIG. 1.

FIG. 4 is a perspective view of the disposable liner 14 of FIG. 1. As discussed above, the liners 14 of the device are preferably made from a durable plastic or coated paper material that prevent leak-through such as from wet food, but are thin and low-cost such that they can be disposed of when done being used.

Each liner 14 defines a food receptacle 20 (also for liquids, if desired) in its center that is semi-spherically shaped such that it nests very well with the center recessed portion of the dish. At the upper periphery of the receptacle 20, the liner 14 extends outwardly at a first rim portion 40A, a second rim portion 40B and a third rim portion 40C. These rim portions are collectively the liner rim, which, as shown, extends out from the bowl portion 38.

Separating each rim portion from each other (i.e. between 40A and 40B, 40B and 40C and 40C and 40A) are notches 42A, 42B and 43C. The notches 42A–42C are sized and located to correspond to the three liner retaining elements 28A–28C (see FIG. 2). When inserted properly into the dish, then, the bowl portion 38 lays against the recessed portion of the dish, and the rim lays against the top wall of the dish (see FIG. 2). Because the retaining elements 28A–28C (see FIG. 2) extend through the notches 42A–42C, they prevent the liner(s) from spinning when the pet licks it. Furthermore, the three retaining lips 34A–34C (see FIG. 3) are designed to overhang the inside edge of the notches 42A–42C to resist the liners 14 being lifted out of the dish. Unlike the prior art, however, no adhesive or special removal tool is required. The user need only slightly deflect a portion of the rim inwardly until an adjacent notch can pass inside of its retaining lip. Then the soiled liner 14 can be removed from the dish.

Figure 5:
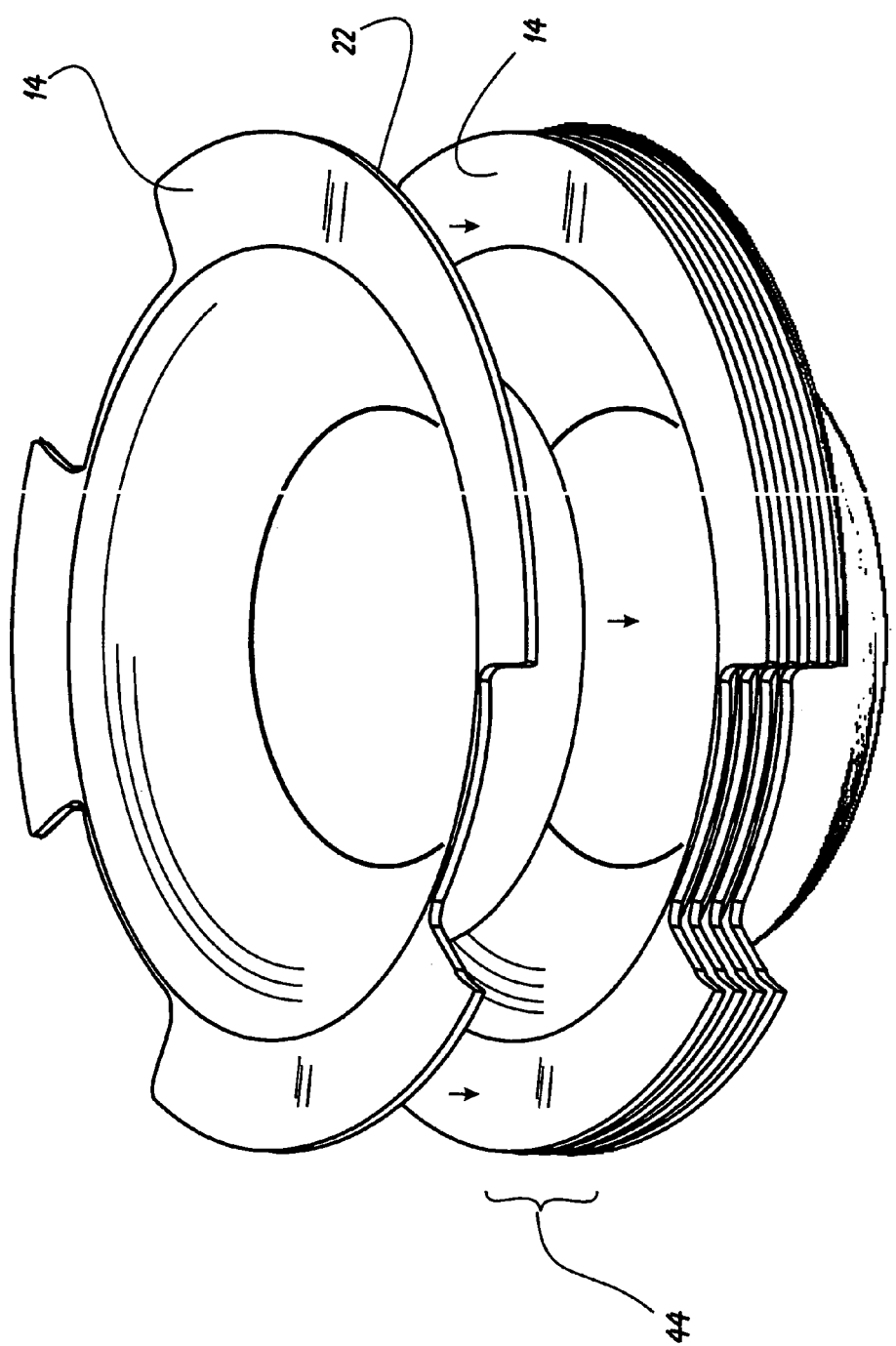
FIG. 5 is a perspective view of a stack of disposable liners of FIGS. 1 and 4.

FIG. 5 is a perspective view of a stack of disposable liners 14 of FIGS. 1 and 4. A substantial benefit of the instant design is that two or more liners 14 can be nested into a stack, and then the stack 44 can be inserted into the dish (or the liners 14 can simply be stacked as they are individually placed into the dish). All of the notches align with one another and with the liner retaining elements so that the entire stack is prevented from spinning or accidental removal. Furthermore, as discussed above, each liner has a side lip 22 formed around the periphery of its rim such that it prevents material from inadvertently finding its way between a pair of adjacent liners 14.

Figure 6:
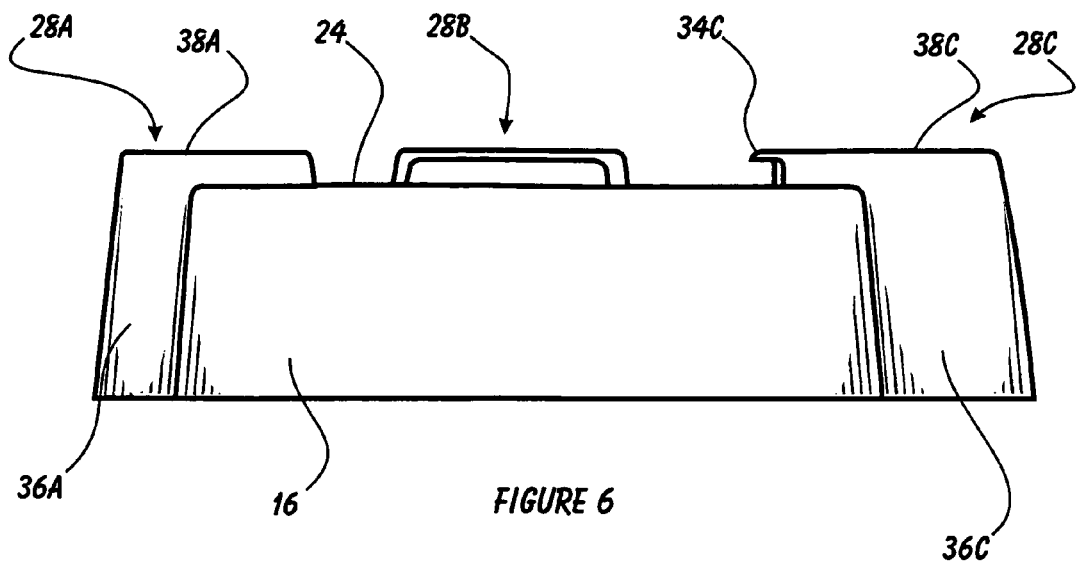
FIG. 6 is a side view of the pet dish of FIGS. 1–3.
Figure 7:
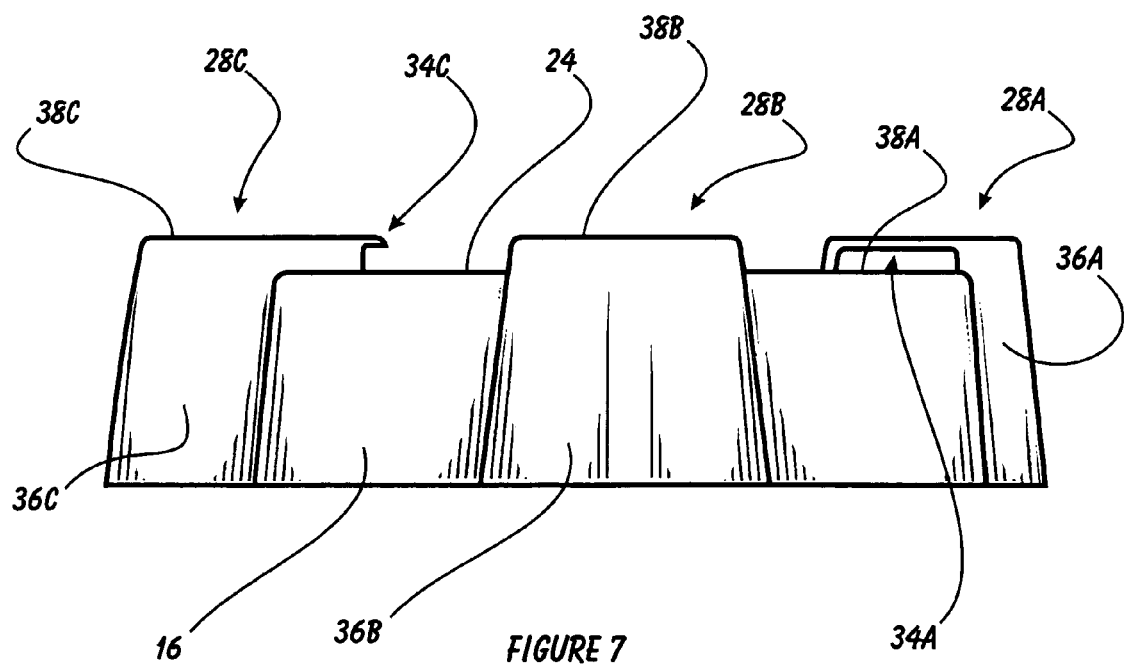
FIG. 7 is another side view of the pet dish of FIGS. 1–3 and 6.

FIGS. 6 and 7 are side views of the pet dish 12 of FIGS. 1–3. Here, the retaining lips 34A–34C can be clearly seen to be a notch formed on the inner surface of reach retaining element 28A–28C such that the top surface 38A–38C of the retaining elements 28A–28C create an overhang that are the lips 34A–34C that hold the liners in place in the dishes.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A dish and liner therefor, the combination comprising:
   a dish comprising a center recessed portion defined by an upper periphery, said upper periphery defined by liner retaining elements and top wall portions in alternating arrangement;
   a liner comprising a receptacle configured to the contour of said center recessed portion, said receptacle defined by an upper periphery, said upper periphery defined by rim portions and notches in alternating arrangement, said notches alignable with said liner retaining elements whereby said rim portions are aligned with said top wall portions, said dish liner retaining elements further define top surfaces, said top surfaces being higher than the level of said top wall portions; and
   said liner retaining elements further comprising retaining lips formed adjacent to said top surfaces and extending inwardly from said liner retaining elements partially overhanging said recessed portion.

2. The combination of claim 1, wherein said center recessed portion and said receptacle are substantially semi-spherical in shape and said top walls and said rim portions extend in a planar fashion outwardly therefrom.

3. The combination of claim 2, wherein said dish comprises a side wall extending around the periphery of said dish, extending downwardly from said top wall portions to a bottom edge of said dish.

4. The combination of claim 3, wherein said liner retaining elements are further defined by side walls, said liner retaining elements extending outwardly from said dish side wall.

5. The combination of claim 4, wherein a first said liner retaining element top surface is shaped to resemble a tongue.

6. The combination of claim 5, wherein a second and third said liner retaining element top surface are shaped to resemble animal ears.

7. A pet dish having a removable liner, comprising:
   a dish comprising a center recessed portion defined by an upper periphery, said upper periphery defined by first, second and third liner retaining elements and first, second and third top wall portions in alternating arrangement; and a liner inserted into said center recessed portion, said liner comprising a receptacle configured to the contour of said center recessed portion, said receptacle defined by an upper periphery, said upper periphery defined by rim portions and notches in alternating arrangement, said notches alignable with said liner retaining elements whereby said rim portions are aligned with said top wall portions, said dish liner retaining elements further define top surfaces, said top surfaces being higher than the level of said top wall portions, wherein said liner retaining elements further comprise retaining lips formed adjacent to said top surfaces and extending inwardly from said liner retaining elements partially overhanging said recessed portion.

8. The dish of claim 7, wherein said first liner retaining element top surface is shaped to resemble a tongue.

9. The dish of claim 8, wherein said second and third liner retaining element top surfaces are shaped to resemble animal ears.

10. The dish of claim 9, wherein said center recessed portion and said receptacle are substantially semispherical in shape and said top walls and said rim portions extend in a generally planar fashion outwardly therefrom.

11. The dish of claim 10, wherein said dish comprises a side wall extending around the periphery of said dish, extending downwardly from said top wall portions to a bottom edge of said dish.

12. The dish of claim 11, wherein said liner retaining elements are further defined by side walls, said liner retaining elements extending outwardly from said dish side wall.

13. A pet dish having a liner, comprising:

a dish comprising a center recessed semi-spherically shaped portion defined by an upper periphery, said upper periphery defined by first, second and third liner retaining elements and first, second and third top wall portions in alternating arrangement, said first liner retaining element defining a top surface in the shape resembling an animal tongue, said second and third liner retaining elements defining top surfaces in the shape of animal ears; and a liner inserted into said center recessed portion, said liner comprising a receptacle configured to the contour of said center recessed portion, said receptacle defined by an upper periphery, said upper periphery defined by rim portions and notches in alternating arrangement, said notches alignable with said liner retaining elements whereby said rim portions are aligned with said top wall portions.

14. The dish of claim 13, wherein the inner surface defined by said center recessed portion and the outer surface defined by said receptacle are smooth and without protrusions extending therefrom.

15. The dish of claim 14, wherein said inner retaining elements further comprise retaining lips formed adjacent to said top surfaces and extending inwardly from said liner retaining elements partially overhanging said recessed portion.

16. The dish of claim 15, wherein said outer edges of said rim portions are defined by downwardly-turned side lips, said side lips configured to overhang top wall portions interconnecting said liner retaining elements.

* * * * *